United States Patent [19]

Gyr

[11] Patent Number: 5,027,651
[45] Date of Patent: Jul. 2, 1991

[54] NON-REVERSING LOAD DETECTOR FOR A RECIPROCATING ELEMENT

[75] Inventor: Rudolf Gyr, Bath, N.Y.

[73] Assignee: Dresser-Rand Company, Corning, N.Y.

[21] Appl. No.: 526,477

[22] Filed: May 21, 1990

[51] Int. Cl.$^5$ .................... G01M 19/00; G01L 1/22
[52] U.S. Cl. ................... 73/168; 73/862.68; 73/862.67
[58] Field of Search .......... 73/862.62, 862.64, 862.65, 73/862.67, 168, 862.68

[56] References Cited

U.S. PATENT DOCUMENTS

| | | | |
|---|---|---|---|
| 2,498,881 | 2/1950 | Eldridge, Jr. | 73/862.67 X |
| 3,272,006 | 9/1966 | Eckard | 73/862.65 |
| 3,899,924 | 8/1975 | Klein | 73/862.67 |
| 4,805,451 | 2/1989 | Leon | 73/168 |
| 4,879,901 | 11/1989 | Leon | 73/168 |
| 4,882,937 | 11/1989 | Leon | 73/862.67 |

FOREIGN PATENT DOCUMENTS

| | | | |
|---|---|---|---|
| 194378 | 2/1966 | U.S.S.R. | 73/168 |
| 456161 | 9/1972 | U.S.S.R. | 73/168 |
| 1093922 | 5/1984 | U.S.S.R. | 73/862.68 |

Primary Examiner—Stuart S. Levy
Assistant Examiner—Joseph A. Rhoa
Attorney, Agent, or Firm—Bernard J. Murphy

[57] ABSTRACT

The detector has a pair of matched strain gauges bonded to a piston rod, one gauge being fixed parallel with the axis of reciprocation and one fixed transverse thereto. The former gauge is the active one, and the other is a dummy. Circuitry is coupled to the gauges to sense the disparity in resistances thereof, and further transistor circuitry is provided to establish compressive and tensile thresholds of the pistion rod. If given thresholds are not reached, or manifest non-sinusoidal excursions, detector circuitry signals a non-reversing load condition.

5 Claims, 1 Drawing Sheet

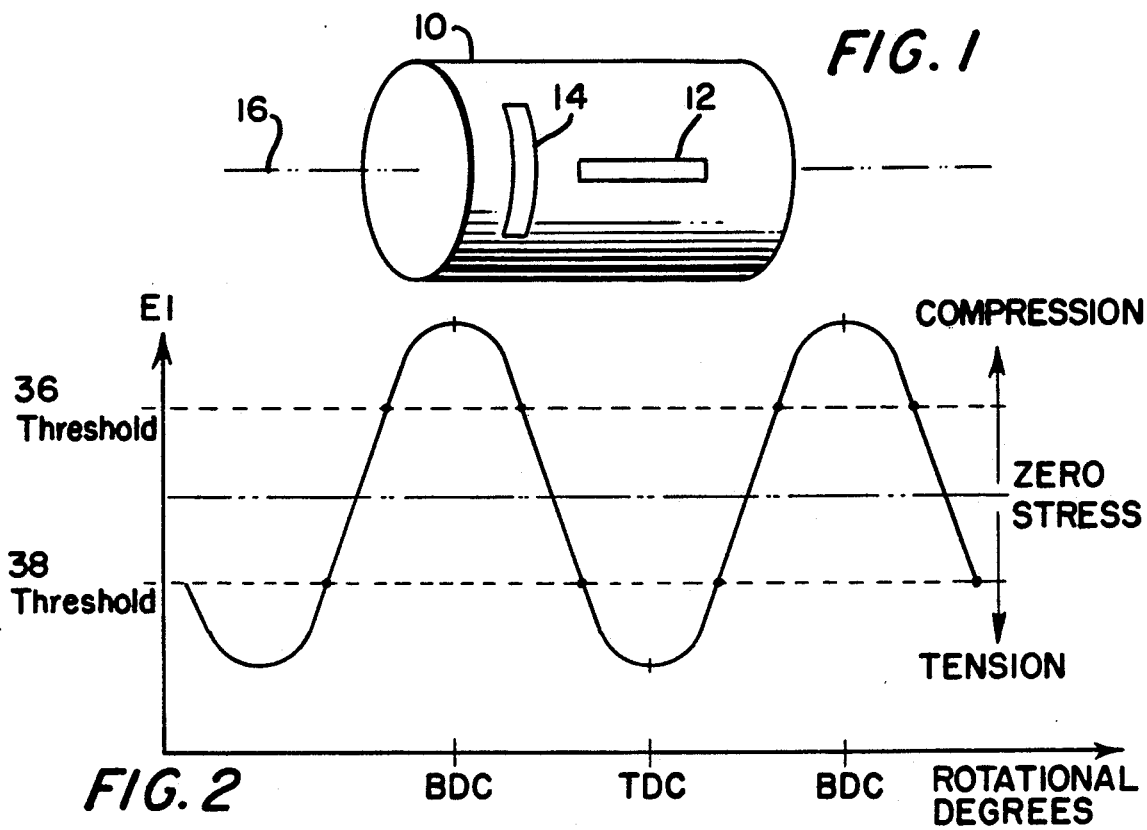
FIG. 1
FIG. 2
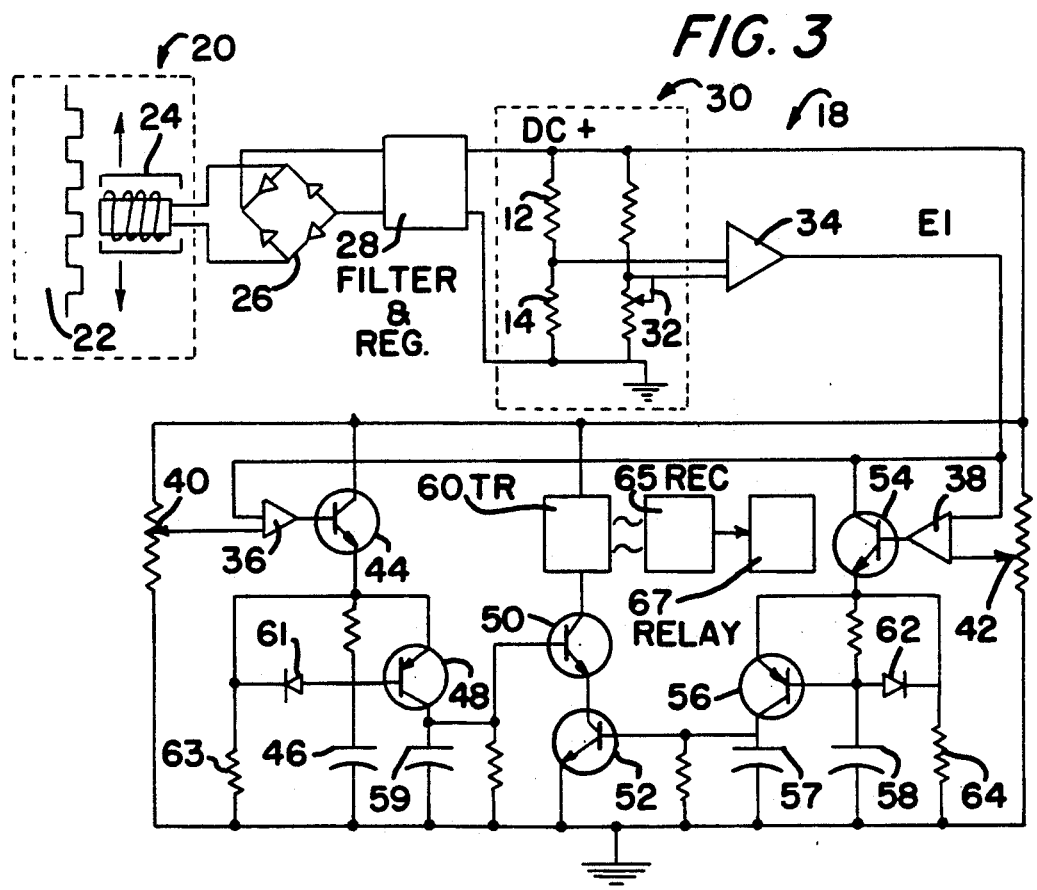
FIG. 3

NON-REVERSING LOAD DETECTOR FOR A RECIPROCATING ELEMENT

This invention pertains to means for detecting and/or sensing functional failures in machines, and in particular to means for detecting a lack of load reversal in reciprocating elements.

While explained and described in connection with a reciprocating piston rod in a gas compressor, it is to be understood that the invention has application in other reciprocating-element machines.

Double-acting, reciprocating gas compressors are susceptible to mechanical failures due to the loss of lubrication at the crosshead pin, the same resulting from a lack of load reversal on the pin.

What is needed is a facile and reliable means for detecting the absence of load reversal in such aforesaid circumstances, and such means which will emit a signal to announce the condition so that the machine can be shut down before significant damage is experienced.

It is an object of this invention to meet the aforesaid need for a non-reversing load detector for a reciprocating element.

It is particularly an object of this invention to set forth a non-reversing load detector for a reciprocating element, comprising a source of electrical potential; variable-resistance, strain gauging means (a) attached to a reciprocating element, and (b) coupled to said source; means coupled to said strain gauging means for sensing (a) normal and (b) abnormal resistance excursions in said gauging means; and means coupled to said sensing means, and responsive to sensed abnormal resistance excursions, for emitting a non-reversing load detection signal.

It is a feature of this invention to measure the strain in a reciprocating element, for example, a piston rod, and detect the presence or absence of adequate reversal of loading during each crankshaft revolution. By way of explanation, when a gas compressor operates completely unloaded, the inertial loading of the reciprocating components imposes loading on the piston rod and crosshead pin which is approximately sinusoidal. The stress in the piston rod goes through zero during each one hundred and eighty degrees of crankshaft rotation. When the dynamic gas loading is superimposed on the inertial loading, conditions may occur in which load reversal on the piston rod and the crosshead pin no longer takes place. As noted, the invention monitors the strain in the reciprocating element, i.e., the piston rod, and detects adequate or inadequate load reversal with each rotation of the crankshaft.

Further objects of this invention, and other features thereof, will become more apparent by reference to the following description taken in conjunction with the accompanying figures, in which:

FIG. 1 is a perspective view of a portion of a piston rod to which a pair of matched strain gauges have been affixed;

FIG. 2 is a representation of the sinusoidal excursions of tensile and compressive stress imposed on the piston rod; and FIG. 3 is a schematic diagram of the novel non-reversing load detector, according to an embodiment of the invention.

As shown in FIG. 1, a piston rod 10 subject to excursions of tensile and compressive stress has a pair of matched strain gauges 12 and 14 bonded thereto. The gauge 12 is fixed to the rod 10 in parallel with the axis 16 of rod reciprocation. Gauge 12, then, will experience the stress excursions of the rod 10. Gauge 14 is fixed perpendicular to the axis 16 as it is provided to provide a stress reference for gauge 12. Gauge 14, then, constitutes a dummy gauge, whereas gauge 12 is the active gauge.

With reference to FIG. 3, the non-reversing load detector 18 is powered by a magnetic generator 20. The same comprises a ferrous member 22 which has discontinuities in the surface thereof, and an inductance 24 carried by the rod 10 in close proximity to the surface of the member 22. The latter can be the inner wall of a cylinder in which the piston reciprocates, or the like.

A rectifier 26 and filter and regulator 28 rectify, filter and regulate the output voltage, and conduct the same to a bridge circuit 30 formed of the strain gauges 12 and 14. Circuit 30 includes a potentiometer 32 provided to "zero" the circuit 30 when the machine (gas compressor) is at rest. The output of the circuit 30 is conducted to a differential linear amplifier 34. The latter develops an output voltage E1 which is proportional to changes in the resistance of gauge 12 relative to the resistance of gauge 14.

The output voltage E1, of the differential linear amplifier 34 is conducted to, and monitored by a pair of high gain amplifiers 36 and 38. Switching thresholds of amplifiers 36 and 38 (FIG. 2) are independently adjustable by means of potentiometers 40 and 42. At the adjusted thresholds, amplifier 36 switches at the compressive strain threshold, and amplifier 38 switches at the tensile strain threshold. With normal operation of the gas compressor, each amplifier 36 and 38 switches on and off once during each crankshaft revolution. A non-reversing load condition obtains when either amplifier 36 or 38 remains in the "on" or "off" state for more than one revolution. Circuitry for sensing such a circumstance is comprised by the invention.

When the compressive strain threshold is reached amplifier 36 drives a transistor 44 to saturation causing the latter to conduct. With capacitor 46 discharged, transistor 48 conducts momentarily to drive another transistor 50 to saturation and conduction. If the rod 10 remains in compression, amplifier 36 and transistor 44 remain turned on. At this time, capacitor 46 charges to turn off transistor 48, and the latter, in turn, turns off transistor 50. If the compressive strain fails to reach the threshold of amplifier 36, transistor 44 remains off, and so too does transistor 50 remain off.

In a similar scenario, transistor 52 is turned on only as long as tensile strain fluctuates sinusoidally to turn amplifier 38 off and on during each revolution. Both transistors 50 and 52 must be on together in order to signal a non-reversing load condition. For the tensile stress sensing portion of the schematic, transistor 54 corresponds to transistor 44, transistor 56 corresponds to transistor 48, and capacitor 58 corresponds to capacitor 46.

In the circumstances wherein both transistors 50 and 52 are conducting, a transmitter 60 will be caused to operate. In one embodiment, transmitter 60 is an infra red transmitter; in another embodiment, transmitter 60 is a radio frequency transmitter. Operation of the transmitter 60 will be detected by the receiver 65 (receiving either infra red or radio frequency signals), and the latter, in turn, actuates a relay 67. Clearly, the relay can be employed to set off an audible or visual alarm or to shut down the compressor.

As aforesaid, when compressive strain in the piston rod 10 reaches the threshold of amplifier 36, the amplifier's output voltage turns on transistor 44, causing it to conduct. With capacitor 46 in a low or zero charge state, transistor 48 conducts, turning on transistor 50 and charging capacitor 59. Transistor 48 stops conducting when the compressive strain falls below the threshold of amplifier 36 (turning off transistor 44) or when capacitor 46 becomes charged, depending upon which event occurs first.

Transistor 50 remains in the "ON" (conductive) state until capacitor 59 is discharged. The sizing of capacitor 59 is such that one pulse from transistor 44 keeps transistor 50 turned on for at least one complete crankshaft revolution.

When the compressive strain in the piston rod 10 falls below the threshold of amplifier 36, transistor 44 turns off and capacitor 46 discharges through diode 61 and resistor 63. This prepares the circuitry for the next pulse from transistor 44.

When tensile strain in the piston rod 10 reaches the threshold of amplifier 38, the amplifier's output voltage turns on transistor 54, causing it to conduct. With capacitor 58 in a low or zero charge state, transistor 56 conducts, turning on transistor 52 and charging capacitor 57. Transistor 56 stops conducting when tensile strain falls below the threshold of amplifier 38 (turning off transistor 44) or when capacitor 58 becomes charged, depending upon which event occurs first.

Transistor 52 remains in the "ON" (conductive) state until capacitor 57 is discharged. The sizing of capacitor 57 is such that one pulse from transistor 54 keeps transistor 52 turned on for at least one complete crankshaft revolution. When the tensile strain in the piston rod 10 falls below the threshold of amplifier 38, transistor 54 turns off and capacitor 58 discharges through diode 62 and resistor 64. This prepares the circuitry for the next pulse from transistor 54.

In the aforedescribed circumstances, the machine is operating with a satisfactory strain reversal during each crankshaft revolution; capacitors 59 and 57 get recharged once every revolution and, consequently, transistors 50 and 52 remain "ON" and the transmitter 60 is continuously energized.

If the piston rod 10 remains under compressive loading, i.e., beyond a complete crankshaft revolution, amplifier 36 remains on, capacitor 46 charges, and transistor 48 turns off. Capacitor 59 discharges and transistor 50 turns off to de-energize transmitter 60.

If the piston rod 10 remains under tensile loading, amplifier 38 remains on, capacitor 58 charges and transistor 56 turns off. Capacitor 57 discharges, and transistor 52 turns off to de-energize transmitter 60.

If the piston rod 10 fails to achieve sufficient compressive loading to trigger amplifier 36, capacitor 59 will not get recharged. Transistor 50 turns off to de-energize transmitter 60 when capacitor 59 discharges.

If the piston rod 10 fails to reach sufficient tensile loading to trigger amplifier 38, capacitor 57 will not get recharged. Transistor 52 turns off to de-energize transmitter 60 when capacitor 57 discharges.

While I have described my invention in connection with a specific embodiment thereof, it is to be clearly understood that this is done only by way of example, and not as a limitation to the scope of my invention, as set forth in the objects thereof and in the appended claims. For instance, in lieu of the magnetic generator 20, a source of power could be provided by a battery. Too, the relay 64, energized as long as the transmitter 60 is transmitting, could initiate compressor shutdown upon deenergization when the transmitter 60 stops transmitting. Also, Hall-effect (or equivalent) proximity devices could be employed to provide signals at bottom dead center, mid-stroke, and top dead center, and accompanying logic circuitry would determine that the appropriate transitions between compression and tension occur during the proper quadrants of crankshaft rotation.

The aforesaid, and all such modifiactions and variations are deemed to be within the scope of my invention and comprised by the following claims.

I claim:

1. A non-reversing load detector for a reciprocating element, comprising:

a source of electrical potential;

variable-resistance, strain gauging means (a) attached to a reciprocating element, and (b) coupled to said source;

means coupled to said strain gauging means for sensing (a) normal and (b) abnormal resistance excursions in said gauging means; and means coupled to said sensing means, and responsive to sensed abnormal resistance excursions, for emitting a non-reversing load detection signal; wherein said strain gauging means comprises a pair of matched strain gauges;

one of said strain gauges is bonded to said reciprocating element parallel to the reciprocating axis of said element;

the other of said strain gauges is bonded to said reciprocating element perpendicular to the reciprocating axis of said element;

said sensing means comprises means for developing a voltage which is proportional to changes in resistance of one strain gauge relative to resistance of said other strain gauge;

said strain gauges are connected in a bridge circuit;

said voltage developing means comprises a differential linear amplifier connected to said bridge circuit;

said signal-emitting means includes a pair of high gain amplifiers;

one of said amplifiers switches on and off at a given threshold of compressive strain of said one strain gauge, and the other of said amplifiers switches on and off at a given threshold of tensile strain of said one strain gauge; and said differential linear amplifier has its output connected to said amplifiers.

2. A non-reversing load detector according to claim 1, wherein:

said excursions-responsive means comprise strain-reversal detecting circuitry coupled to said amplifiers, and having signal-emitting means and signal-receiving means operative in response to non-sinusoidal excursions of detected strain reversals.

3. A non-reversing load detector, according to claim 1, wherein: said source of electrical potential comprises a magnetic generator.

4. A non-reversing load detector, according to claim 1, wherein:

said strain gauging means comprises a strain gauge bonded to a reciprocating element parallel to the reciprocating axis of said element.

5. A non-reversing load detector, according to claim 4, further including:

means bonded to said reciprocating element for defining a resistance base for said strain gauge.

* * * * *